April 2, 1957 J. T. HARTMEISTER ET AL 2,787,324
WALLBOARD CUTTER
Filed March 15, 1954 2 Sheets-Sheet 2

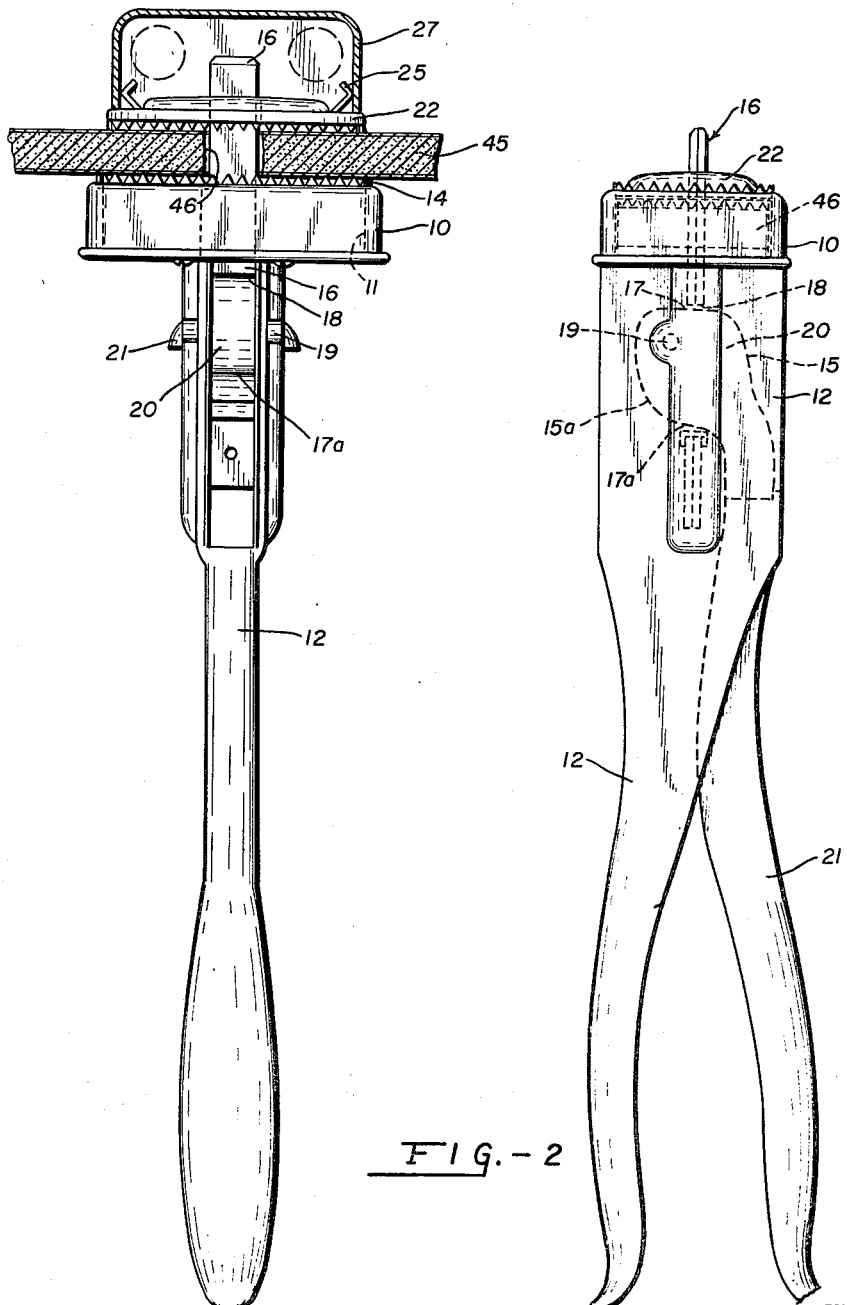

INVENTORS
Joel T. Hartmeister
Ernest Rodenberg, Sr.
BY
ATTORNEY

United States Patent Office 2,787,324
Patented Apr. 2, 1957

2,787,324
WALLBOARD CUTTER

Joel T. Hartmeister and Ernest Rodenberg, Sr., Denver, Colo.

Application March 15, 1954, Serial No. 416,138

8 Claims. (Cl. 164—95)

This invention relates to a wallboard cutting device, and more particularly to a device for cutting precision holes in dry wall, wallboard, and the like wall coverings after installation and in a precise spot to expose an electric fixture, or the like.

In modern housing construction, a substantial amount of dry wall, wallboard, and the like wall covering construction is utilized. Such wall covering is obtained in fairly large sheets, as for instance, four feet by eight feet, and in varying thicknesses. In the construction of houses utilizing such wall covering, electrical outlet boxes, receptacles and wiring and the like are installed on the bare partition or wall studs prior to the installation of the wall covering. The wall covering is then secured to the studs covering the electrical installations, and holes are then bored through the wall covering into the electrical fixtures. Considerable time is utilized in cutting a hole of correct dimensions through the wall covering to expose the extent of the electric fixture boxes so that a switch, outlet plug, or the like may be installed in the fixture boxes. According to general practice, after measuring to determine the location of the electric box, a small random hole is bored through the wallboard and then a keyhole or like saw is used to saw out a slug of wallboard to make the hole of satisfactory size for the installation of the inner working of the box and a covering for the outlet.

According to the present invention we have discovered a device for cutting a precision hole which eliminates the use of the keyhole saw and provides a clean cut hole of the exact size required for the electric fixtures boxes or receptacles. In general, the device comprises a pair of cutters one of which is inserted in the electric receptacle prior to installation of the wallboard. After the installation of the wallboard, the receptacle is found by measuring from a base point and a hole as usual is bored through the wall into the receptacle. A tool, which includes a joining member, is then pushed through the hole in the wallboard into the cutter in the electric receptacle. The joining member grabs and is secured to the cutter and it is then drawn to the outer cutter secured to the tool. The cutters cut a slug out of the wall covering of approximately the same size as the electric receptacle. The slug is cut out of the wallboard in the matter of a second or two whereas the sawing requires a substantial period to complete the job of sawing a hole to sufficiently expose the electrical receptacle for insertion of the fixture and hold the cover. The device provides not only a smooth opening through the wallboard in substantially less time than prior practices, but also provides a precision opening in the wallboard which will not vary from outlet to outlet.

It is therefore an object of the present invention to provide a cutting device for cutting a precision hole through wallboard and like wall coverings.

It is another object of the present invention to provide a cutting device which will cut a precision hole in wallboard of substantially the same size as an electrical receptacle.

It is a still further object of the present invention to provide a cutter which will cut a hole in wallboard quickly and efficiently without tearing the sheathing for the wallboard.

These and other objects and advantages of the present invention may be readily ascertained by having reference to the following illustrations and description. Referring to the illustrations:

Fig. 1 is an elevation of the device in operable position;

Fig. 2 is a side elevation of the device of Fig. 1 in position after cutting a slug in the wall;

Figure 3:
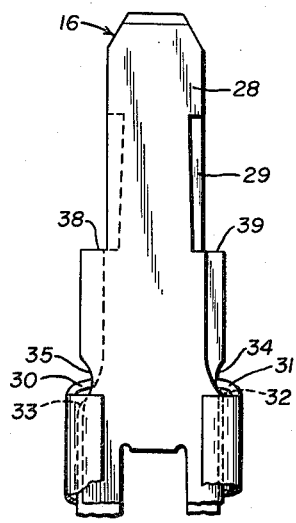
Fig. 3 and Fig. 4 are detailed elevations of the gripping device of the tool of Figs. 1 and 2.

The device shown in Figs. 1 and 2 comprises a cutting head 10 secured to a lever arm 12. The cutting head has a recess 11 sufficient to completely accomodate therein a slug of the thickest wallboard for which the cutter is designed and a portion of an inner cutter. The edge of the recess 11 provides one side of the wallboard cutter, and includes a serrated cutting edge 14. This edge is adapted to cut through the sheathing on one side of the wallboard. Extending through the head and into the lever arm is a pair of cam operated gripping bars 16. A lateral opening 18 in the gripping bars accommodates a cam 20 which is pivotally rotatable within the lever arm 12 on a pin 19. The cam 20 is secured to the inner end of a movable lever arm 21. The movable lever arm moves in a scissors action in relation to lever arm 12, rotating cam 20 about its pivot 19 thereby moving the grip bars inwardly and outwardly through the head 10. The grip bars include front bar 28 and a rear bar 29.

A pair of cam projections 30 and 31, at the inner section of lever arm 12 in the head 10 provide means for operating the grip bars to hold an inner cutter 22. In fully extended position, Fig. 3, the ends of the grip bars are moved to a minimum profile alignment so that the grip bars can penetrate a tight fitting hole 23 in an inner cutter 22. The grip bars are moved into such alignment, as the lever arm 21 is extended to full open position and the grip bars are fully extended by the action of cam 20 therein, by means of a front raised portion 32 coming in contact with right cam projection 31 on the one side and a rear raised portion 33 coming in contact with the left cam extension 30 on the opposite side of the grip bars. In this extended position, the right cam projection 31 engages the front cam rise 32 which moves the front bar 28 in substantial vertical alignment, and at the same time the front cam depression 35 in engagement with projection 30 permits the front grip bar to move under the influence of the cam projection 31. Likewise, the rear grip bar 29 is moved into vertical alignment by means of the left cam projection 30 engaging the rear cam rise 33 and at the same time the right rear cam depression 34 permits the movement of the bar towards the projection 31. On retracting the bars within the head, to the position of Fig. 4, the left cam projection 30 forces the front grip bar 28 laterally as the cam projection 30 moves out of the depression 35 up along the left side of the front grip bar 28, and at the same time the right front cam 31 moves along from the rise 32 to the side of the grip bar permitting the tilting movement of the bar laterally to the right. The rear grip bar 29 is tilted to the left by the cam projection 31 moving from the depression 34 up the right side of the bar forcing the bar laterally to the left and at the same time the left cam projection 30 moves from the rise 33 along the side of the rear bar grip.

The front grip bar 28 has an overhang 36, and the rear grip bar 29 has an overhang 37 which grip the inner cutter 22 along the back thereof when the lever bar 21 is moved toward retracted position and the grip bars are in position in hole 23 in the cutter.

Figure 5:
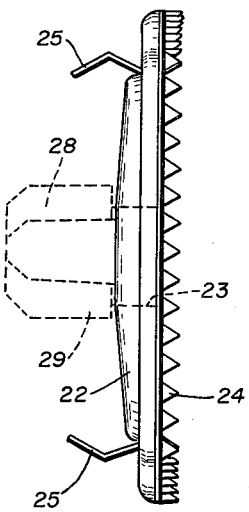
Fig. 5 is a side elevation of an inner cutter according to the invention.
Figure 7:
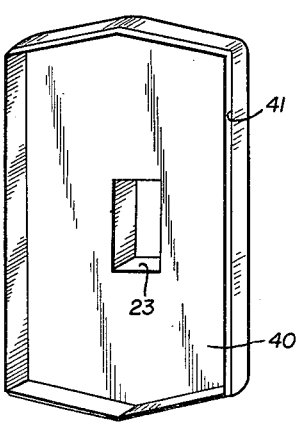
Fig. 7 is a perspective view of still another modified cutter according to the invention.

The inner cutter 22 comprises a cutting edge 24 which is approximately the same shape as the desired hole. The inner cutter is adapted to telescope within the outer cutter as shown in Figure 2. The inner cutter includes spring members 25 secured thereto to hold the cutter in position inside an electric receptacle or fixture box 27. The cutter may have a serrated cutting edge as shown in Figure 5, or the edge may merely be a straight shear edge, such as a sharp cutting edge 41 on the inner cutter 40 as shown in Figure 7. The choice of the serrated cutting edge or the straight cutting edge is, generally, dictated by the particular material being cut.

Figure 4:
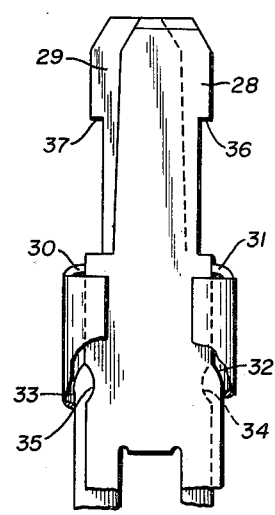

In the operation of the device, an electrical outlet box is first secured to the studs of the new building, and a cutter, such as the inner cutter 22 is inserted in the outlet box. A sheet of wallboard covering 45 is then placed in position on the studs and is secured in place. The wall covering completely hides the outlet boxes. As in common practice, the boxes are found by measuring from a predetermined point. After determining the approximate position of the box by measuring, a random hole 46 is cut through the wallboard, as by a bit, center cutter, and the like so that the hole 23 in the inner cutter is substantially exposed. The lever arms of the cutter are then moved full open so that the grip bars are in the position as shown in Figure 3. The grip bars are then inserted through the hole in the wallboard through the hole 23 in the inner cutter. The lever arms are scissored together which first moves the gripping surfaces 36 and 37 outwardly along the back of the inner cutter to securely grip the cutter. Further retraction of the grip bars pulls the inner cutter towards the outer cutter. The action of the cutter is in three distinct phases of movements. The first movement of the arm extends the grip surfaces of the grip bars, the next movement of the lever arms forces the cutting edges through the covering or sheathing of the wallboard, and the final movement pulls the inner cutter and a slug of wallboard into the recess in the base 10 to complete the cut. The cam 20 is constructed so that when lever arm is in extended position a relatively flat surface 15 and its opposing surface 15a are the surfaces in contact with the gripping bar 16. The relatively flat surface provides for a substantial movement of the lever arm with relatively small retracting movement of the grip bars 16. This permits a substantial pressure to be exerted to initially start the cutting procedure. After about a quarter of the scissor movement of the lever arm 21, the cam surface abruptly changes to cam surface 17 and opposing surface 17a so that there is a substantially greater movement of the grip bar 16a with the equivalent movements of the lever arm 21. The cam arrangement provides small grip bar movement at the point of the greatest required pressure, that is, to initially start the cutting movement. Once the cutting movement has been initiated the amount of force required to complete the cutting is substantially less and the cam surface abruptly changes to permit a greater movement of the grip bars with scissor movement of lever arm 21 and therefore cause a faster retraction during the later movements of the lever arm when less pressure is required.

As the arm 21 moves into closed position, a slug of wallboard 46 and a portion of the inner cutter 22 telescopes in recess 11 of the base 10, completing the cutting movements. The hole cut out of the wallboard is a clean cut hole through the wallboard, and is the exact shape of the cutters which approximate the shape of the receptacle. The total time of cutting the hole is substantially less than by prior art methods where the electrical outlet box must be similarly positioned by measurements, a hole cut through to the box, but a saw or other cutter is used to cut out a slug the shape of the receptacle. Also with the sawing of the hole the cut is normally ragged and not in good condition.

Figure 6:
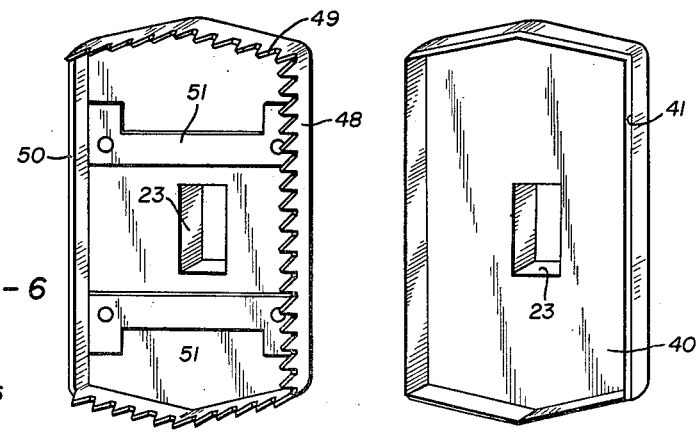
Fig. 6 is a perspective view of a modified cutter.

In many instances, several outlet boxes are joined together to make a large receptacle, as for instance for double, triple and quadruple switches, switch and an outlet combination, a light and a switch combination and so forth. Where multiple boxes are used, a three sided cutter, Figure 6, is used to provide the cutting of a sufficient hole for the multiple boxes. In this instance, a three sided cutter 48 has a serrated edge 49, which extends around one side and both ends leaving the fourth side 50 blank. The cutter has a hole 23 in the center thereof to accommodate the grip bars, as before, and may include a reinforcing strip 51 across each end thereof. The cutter also includes a spring grip 25 for securing the cutter in the electrical receptacle box during the fastening of the wallboard to the studs. In operation, a four sided cutter is placed in one of the ends of the joined boxes, and as many of the three sided cutters as needed are placed alongside the four sided cutter in the remaining boxes. Each three side cutter having the blank side 50 next to a cutting edge of the adjacent cutter. The box position is then determined after the installation of the wallboard, and a random hole is cut to expose each of the grip holes of the cutters. The four sided cutter is first pulled through to cut a cut slug, and then in progression the next adjacent three sided cutter is pulled through to cut out the second slug exposing the two joined boxes, and so on through all the cutters. In multiple boxes containing more than two boxes joined together, a four sided cutter is always used in one end, and the three sided cutters are then placed one next to the other always providing a blank side against the cutting edge. This way, any number of boxes may be joined, and by providing a cutter in each box a clean cut hole may be had, exposing the individual boxes in the multiple joined boxes.

Figure 8:
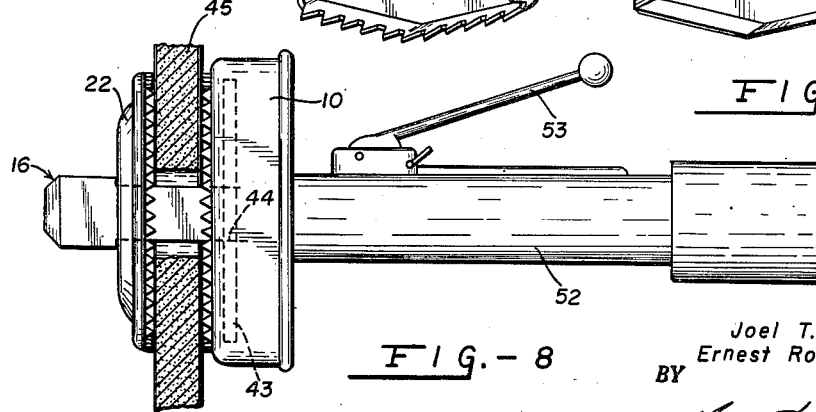
Fig. 8 is a modified cutter according to the invention.

As the force required to cut through wallboard is substantial, it may be desirable to utilize a different means for pulling the inner cutter through to the outer cutter to cut a slug of the wallboard. In Fig. 8, a hydraulically operated cylinder 52 is utilized in the place of the lever arms of the device shown in Figs. 1 and 2. In this case, the grip bar 16 is secured to a hydraulic cylinder which moves the grip bar in and out of the base head 10. The cylinder may be any of the hand operated hydraulic cylinders, such as the common hydraulic automobile jack, in which case it includes a pump 53 to cause a flow of fluid for operating the cylinder.

The cutters cut out a slug of wallboard between the closely aligned cutting edges thereof, and the wallboard slug is a close fit in the recess 11 in the base head 10. An ejector plate 43, shown in Fig. 8, may be provided to eject the slug from the recess 11. The ejector plate is a flat plate having a hole 44 therethrough adapted to fit over the grip bars 16 and rest on front ledge 38 and rear ledge 39. The ejector plate rests on the two ledges and moves from the bottom to about the top of the recess 11 as the ejector bar is moved in and out. After cutting the slug, the ejector bar is moved back to extended position moving the ejector plate along with it and ejecting the slug from the recess. Once removed from the recess, the ejector bars may be extended fully and the inner cutter removed, so that the slug may be removed from the ejector bars.

It is obvious that other types of grip means may be utilized to grip the inner plate through the wallboard, one simple expedient has been shown in the present application. For extended use, the grip means must be rugged and capable of withstanding great stresses, since the slug cut from the wallboard is approximately four and one half by three inches long so that the actual cutting profile on the perimeter of the slug is of substantial length requiring a great amount of force to cut through the wallboard. Likewise, other mechanisms may be utilized to extend and retract the grip bar for cutting the slug from the wallboard. The device has been described for cutting a hole to expose an electric receptacle box, and the shape of the cutters has been shown to substantially fit such common receptacle boxes as are on the market today. However, the design of the cutters may be changed to fit any size or shape of hole desired, the principle of cutting through the wallboard obviously will remain the same.

While the invention has been specifically described, there is not intent to limit the invention to the precise details so set forth, except insofar as limited by the following claims.

We claim:

1. In a cutting tool for a sized hole in wallboard and like wall coverings, a pair of separable, telescoping cutters each having a peripheral cutting edge arranged to be juxtaposed on either side of a wall covering over a small random bore which lies within the confines of the cutting edges on said cutters, holding means mounted on one of said cutters for prepositioning the same in a structure prior to installation of wallboard thereon, both of said cutters including central apertures adapted to be aligned with said random bore, a joining means including a dividable member arranged to extend through and snugly fit said apertures, cam means interconnected with said joining means to move said dividable means in position to pass through said apertures when said joining means is in extended position and to move said dividable means into cutter holding position when said joining means is retracted against said cutters, and a lever-cam means for extending said joining means into position to join the said cutters and to retract said joining means to initially apply a large force with small retracting motion of the joining means and then subsequently increasing the retracting motion of the joining means to draw the cutters together and cut out a sized slug of wall covering.

2. In a cutting tool for cutting a predetermined-size hole in installed wallboard and like wall coverings, an inner cutter and an outer cutter each having a peripheral cutting edge, said cutters being separable, said inner cutter arranged to telescope in said outer cutter, said cutters being arranged to be juxtaposed in cutting position on each side of a wall covering over a small random bore which lies within the confines of the cutting edges of both cutters, said inner cutter including spring tension holding means for prepositioning the same in a structure prior to installation of wallboard thereon, each of said cutters including an aperture adapted to be aligned through said random bore, an opening and closing joining member arranged to slidably telescope through each of said apertures of said cutters, activating means for opening said joining member into holding engagement with said cutters, and means for slidably moving said joining means through said outer cutter and thereby draw the held inner cutter into telescoping engagement with said outer cutter and cut a hole in the installed wallboard.

3. In a tool for cutting a sized hole in wallboard, companion, telescoping cutter members including an inner member having means for releasably holding the same in a building structure prior to installation of wallboard thereon, and an outer member adapted for juxtaposing on on the opposite side of said wallboard in front of and aligned with said inner cutter after installation of wallboard on said structure, activating means for said cutter members including a joining member arranged to slidably extend through said outer cutter member and said wallboard into a joining and movement imparting engagement with said inner cutter, and a force applying member operable from the outer cutter side acting on said inner member by the sliding movement of said joining member through said outer member to draw the inner member toward the outer member so as to cut a predetermined size of slug from said wallboard.

4. A tool according to claim 3 in which the force applying member includes lever means cooperative with a multiple cam for operating said joining member.

5. A tool according to claim 3 in which the force applying member includes a hydraulic activator for operating said joining member.

6. A tool for cutting a sized hole in a wallboard comprising an inner cutter member having means for its releasable support at the entrance of an outlet box mounted on a building structure prior to installation of wallboard thereon, an outer cutter member adapted for positioning on the opposite side of said wallboard in front of and aligned with said inner cutter after installation of said wallboard, said inner cutter being arranged for telescoping engagement with said outer cutter, a joining member for slidably extending through said outer cutter and wallboard into contact with said inner cutter, means operable from the outer cutter side for moving said joining member through said outer cutter into gripping engagement with said inner cutter, and means operable from the outer cutter side for slidably moving said joining member outwardly therethrough whereby the inner cutter is moved into telescoping engagement with said outer cutter cutting a sized slug of wallboard therebetween.

7. In a tool for cutting a sized hole in installed wallboard, companion cutter members including an inner member having a peripheral cutting edge arranged in a plane and having means for releasably holding said inner member in a building structure prior to installation of wallboard thereon so that the cutting edge thereof lies substantially normal to and adjacent the inner surface of the installed wallboard, and an outer member having a planar cutting edge arranged to telescope with said inner member, activating means for said cutter members including a joining member arranged to slidably extend through said outer member and wallboard into movement imparting engagement with said inner member, means operable from the outer cutter side for positioning said joining means into movement imparting engagement with said inner cutter, and means for slidably moving said joining member through said outer cutter so as to draw said inner member toward said outer member and cut a slug from said wallboard.

8. In a tool for cutting a hole in installed wallboard, separable inner and outer cutter members constructed and arranged for telescoping engagement, said inner cutter having spring tension holding members for releasably holding the same in a structure prior to installation of wallboard thereon with its cutting edge adjacent the inner surface of the wallboard and said outer cutter arranged for juxtaposing with said inner cutter on the opposite side of installed wallboard, a joining member arranged to slidably pass through said outer cutter and a random hole in the wallboard adjacent said inner cutter into engagement with said inner cutter, means operable from the outer cutter side for moving said joining means into gripping engagement with said inner cutter, and means for slidably moving said joining means through said outer member whereby said inner and outer cutter members are drawn into telescoping engagement cutting a slug from said wallboard.

References Cited in the file of this patent

UNITED STATES PATENTS

| 503,109 | Davis et al. | Aug. 8, 1893 |
| 1,131,582 | Walsh | Mar. 9, 1915 |
| 1,754,568 | Nischan | Apr. 5, 1930 |
| 1,817,223 | Abramson et al. | Aug. 4, 1931 |
| 1,903,234 | Gray | Mar. 28, 1933 |
| 2,005,487 | Zemanek | June 18, 1935 |
| 2,182,744 | Ehrsam | Dec. 5, 1939 |
| 2,633,197 | Nischan | Mar. 31, 1953 |
| 2,643,721 | Arbuckle | June 30, 1953 |

FOREIGN PATENTS

| 604,862 | Great Britain | July 12, 1948 |